US012383993B2

(12) United States Patent
Jin et al.

(10) Patent No.: US 12,383,993 B2
(45) Date of Patent: Aug. 12, 2025

(54) HEAT EXCHANGER PROCESSING METHOD AND HEAT EXCHANGER PROCESSING APPARATUS

(71) Applicant: SANHUA (HANGZHOU) MICRO CHANNEL HEAT EXCHANGER CO., LTD., Zhejiang (CN)

(72) Inventors: Junfeng Jin, Zhejiang (CN); Xiaoming Zhong, Zhejiang (CN); Hangbing Zhou, Zhejiang (CN); Lixin Zheng, Zhejiang (CN); Bibin Ye, Zhejiang (CN)

(73) Assignee: Sanhua (Hangzhou) Micro Channel Heat Exchanger Co., Ltd., Zhejiang (CN)

( * ) Notice: Subject to any disclaimer, the term of this patent is extended or adjusted under 35 U.S.C. 154(b) by 0 days.

(21) Appl. No.: 18/717,697

(22) PCT Filed: Dec. 8, 2022

(86) PCT No.: PCT/CN2022/137624
§ 371 (c)(1),
(2) Date: Jun. 7, 2024

(87) PCT Pub. No.: WO2023/104162
PCT Pub. Date: Jun. 15, 2023

(65) Prior Publication Data
US 2025/0065453 A1 Feb. 27, 2025

(30) Foreign Application Priority Data
Dec. 9, 2021 (CN) .......................... 202111498239.2

(51) Int. Cl.
*B23P 15/26* (2006.01)
(52) U.S. Cl.
CPC .................................. *B23P 15/26* (2013.01)

(58) Field of Classification Search
CPC . B23P 15/26; F28F 1/025; F28F 1/022; F28F 2210/08; F28F 2260/02;
(Continued)

(56) References Cited

U.S. PATENT DOCUMENTS

2010/0027872 A1* 2/2010 Daito .................... G06T 7/0004
382/141

FOREIGN PATENT DOCUMENTS

CN  103128519 A  6/2013
CN  104864762 A  8/2015
(Continued)

OTHER PUBLICATIONS

International Search Report and Written Opinion for corresponding PCT/CN2022/137624, dated Jan. 12, 2023 (English Translation provided).
(Continued)

*Primary Examiner* — Lee A Holly
(74) *Attorney, Agent, or Firm* — K&L Gates LLP

(57) ABSTRACT

A heat exchanger processing method, in which a heat exchanger includes a plurality of micro-channel flat tubes, and the heat exchanger processing method includes: providing a plurality of micro-channel flat tubes, in which each micro-channel flat tube includes a plurality of channels extending in a length direction of the micro-channel flat tube, and the plurality of micro-channel flat tubes are spaced in a first direction; moving a collection assembly starting from an initial position along the first direction to collect specific information of one or more micro-channel flat tubes one by one, and transmitting the specific information to a control assembly; comparing, by the control assembly, the specific information with pre-stored information and generating, based on a comparison result, feedback information; generating, by an instruction assembly based on the feed-
(Continued)

back information, instruction information; and adjusting a position of a corresponding micro-channel flat tube based on the instruction information.

20 Claims, 4 Drawing Sheets

(58) Field of Classification Search
CPC .. F28F 9/262; F28D 1/05383; F28D 1/05316; G01N 21/95
See application file for complete search history.

(56) References Cited

FOREIGN PATENT DOCUMENTS

| | | |
|---|---|---|
| CN | 111007101 A | 4/2020 |
| CN | 111922218 A | 11/2020 |
| JP | 2000337821 A | 12/2000 |
| JP | 2006208372 A | 8/2006 |

OTHER PUBLICATIONS

Chinese Office Action for Chinese Application No. 202111498239. 2, dated Sep. 24, 2024 (English Translation provided).

* cited by examiner

HEAT EXCHANGER PROCESSING METHOD AND HEAT EXCHANGER PROCESSING APPARATUS

CROSS-REFERENCE TO RELATED APPLICATION

This application is a U.S. national phase of International Application No. PCT/CN2022/137624, filed on Nov. 8, 2022, which claims priority to Chinese Patent Application Serial No. 202111498239.2, filed in China on Dec. 9, 2021, both of which are incorporated by reference herein in their entireties for all purposes.

FIELD

The present disclosure relates to the field of micro-channel heat exchanger technologies, and more particularly to a heat exchanger processing method and a processing device for a heat exchanger.

BACKGROUND

In a production process of a micro-channel heat exchangers (also known as multi-channel heat exchangers), a collecting tube and a micro-channel flat tube are often assembled together first, and finally fins are placed and tied together with an iron wire or a steel strip for furnace brazing.

In the related arts, the micro-channel heat exchanger is widely used in the field of air conditioning and refrigeration. The micro-channel heat exchanger includes a plurality of the micro-channel flat tubes, the micro-channel flat tube includes a plurality of channels and a plurality of spacing parts, and each spacing part is located between adjacent channels. When the heat exchanger works, refrigerant flows through the channels of the plurality of the micro-channel flat tubes for heat exchange. A structure and a size of the channel affect a state change of the refrigerant, which in turn affects a heat exchange performance of the heat exchanger.

SUMMARY

Embodiments of a first aspect of the present disclosure provides a heat exchanger processing method, in which a heat exchanger includes a plurality of micro-channel flat tubes, and the heat exchanger processing method includes:
providing a plurality of micro-channel flat tubes, in which each micro-channel flat tube includes a plurality of channels extending in a length direction of the micro-channel flat tube, and the plurality of micro-channel flat tubes are spaced in a first direction;
moving a sampler starting from an initial position along the first direction to collect specific information of one or more micro-channel flat tubes one by one, and transmitting the specific information to a controller;
comparing, by the controller, the specific information with pre-stored information and generating, based on a comparison result, feedback information;
generating, by an instruction circuit based on the feedback information, instruction information; and
adjusting a position of a corresponding micro-channel flat tube based on the instruction information.

Embodiments of the present disclosure also provide a processing device for a heat exchanger, in which the processing device includes a first assembly, a sampler, a controller, and an instruction circuit, in which the first assembly includes a sliding rod, the sampler and the instruction circuit is movable back and forth along the sliding rod, the first assembly further includes a comb-shaped member, a length direction of the comb-shaped member is parallel to a first direction, the comb-shaped member includes a plurality of comb teeth, the comb teeth are spaced in the first direction, and the controller is connected to the sampler and the instruction circuit respectively.

Figure 1:
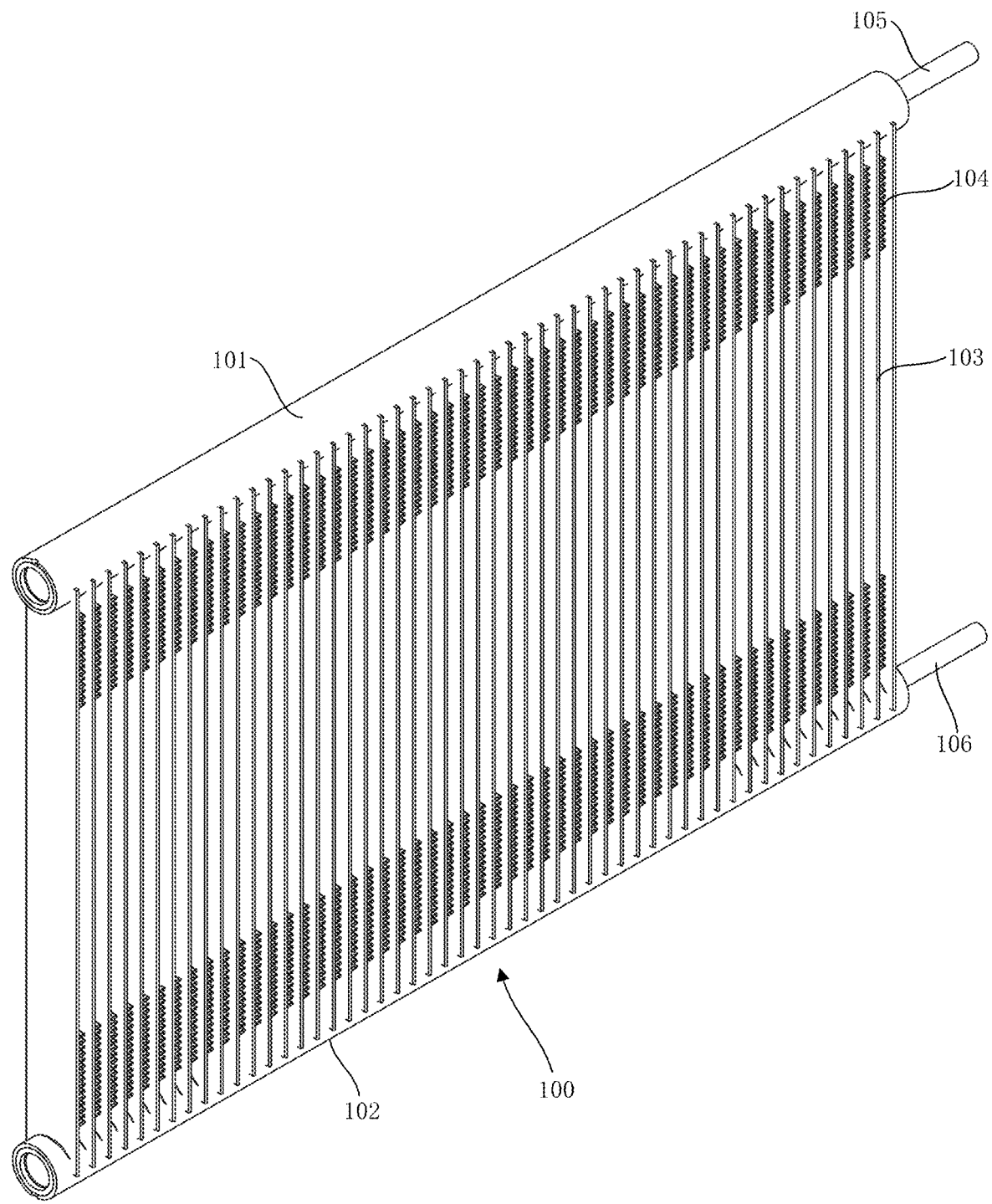
FIG. 1 is a three-dimensional view of a micro-channel heat exchanger provided by embodiments of the present disclosure.

REFERENCE SIGNS 1. supporting frame; 2. installing assembly; 21. sliding rod; 22. comb-shaped member; 3. collection assembly; 100. micro-channel heat exchanger; 101. first collecting tube; 102. second collecting tube; 103. micro channel flat tube; 103a, channel; 104. fin; 105. liquid inlet tube; 106. liquid outlet tube.

DETAILED DESCRIPTION

In order to make purposes, technical solutions, and advantages of the present disclosure more clear and understandable, the following is a further detailed explanation of the present disclosure in conjunction with accompanying drawings and embodiments. It should be understood that the specific embodiments described here are only intended to explain the present disclosure and are not intended to limit it.

In description of the present disclosure, unless otherwise specified and limited, terms "first" and "second" are only used for the purpose of description and cannot be understood as indicating or implying relative importance. Unless otherwise specified or indicated, the term "a plurality of" refers to two or more. Terms "connect, "fix", etc. should be broadly understood, and for example, "connect" can be a fixed connection, a detachable connection, or an integrated connection, or an electrical connection. They may be directly coupled or indirectly coupled through an intermediate medium. For ordinary those skilled in the art, specific meanings of the above terms in the present disclosure may be understood based on specific cases.

In description of the specification, it should be understood that directional words such as "above" and "below" described in embodiments of the present disclosure are described from the perspective shown in the accompanying drawings and should not be understood as limiting the embodiments of the present disclosure. Furthermore, in the context, it should be understood that when an element is mentioned to be connected "above" or "below" another element, it can not only be directly connected "above" or "below" another element, but can also be indirectly connected "above" or "below" another element through an intermediate element.

In a production process of a micro-channel heat exchangers (also known as multi-channel heat exchangers), a collecting tube and a micro-channel flat tube are often assembled together first, and finally fins are placed and tied together with an iron wire or a steel strip for furnace brazing. However, when assembling the collecting tube and the micro-channel flat tube on a tooling platform, human errors such as incorrect installation or reversed installation of the micro-channel flat tube at specific positions, which are difficult to be identified.

In the related arts, the micro-channel heat exchanger is widely used in the field of air conditioning and refrigeration. The micro-channel heat exchanger includes a plurality of the micro-channel flat tubes, the micro-channel flat tube includes a plurality of channels and a plurality of spacing parts, and each spacing part is located between adjacent channels. When the heat exchanger works, refrigerant flows through the channels of the plurality of the micro-channel flat tubes for heat exchange. A structure and a size of the channel affect a state change of the refrigerant, which in turn affects a heat exchange performance of the heat exchanger.

The size of each channel of the micro-channel flat tube is small, an accuracy cannot be guaranteed by manual detection, and an efficiency of large-scale detection is low.

FIG. 1 is a three-dimensional view of a micro-channel heat exchanger according to embodiments of the present disclosure. Referring to FIG. 1, the micro-channel heat exchanger 100 includes a first collecting tube 101, a second collecting tube 102, a micro-channel flat tube 103, a fin 104, a liquid inlet tube 105, and a liquid outlet tube 106. There are a plurality of the micro-channel flat tubes 103 arranged in intervals along a length extension direction of the first collecting tube 101 and the second collecting tubes 102, and two ends of a plurality of the micro-channel flat tubes 103 are respectively connected to the first collecting tube 101 and the second collecting tube 102. The liquid inlet tube 105 is connected to the first collecting tube 101, the liquid outlet tube 106 is connected to the second collecting tube 102, and the fin 104 are arranged between two adjacent micro-channel flat tubes 103.

Figure 2A:
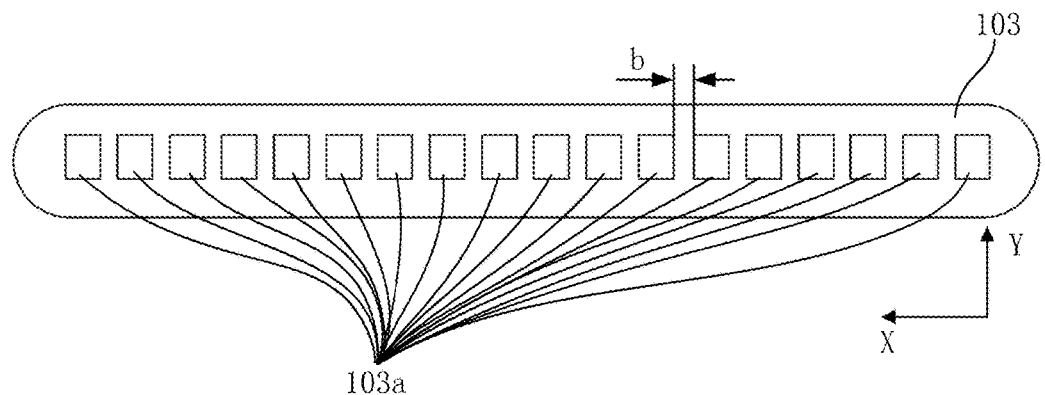
FIG. 2a to FIG. 2c are cross-sectional views of a micro-channel flat tube in FIG. 1.
Figure 2B:
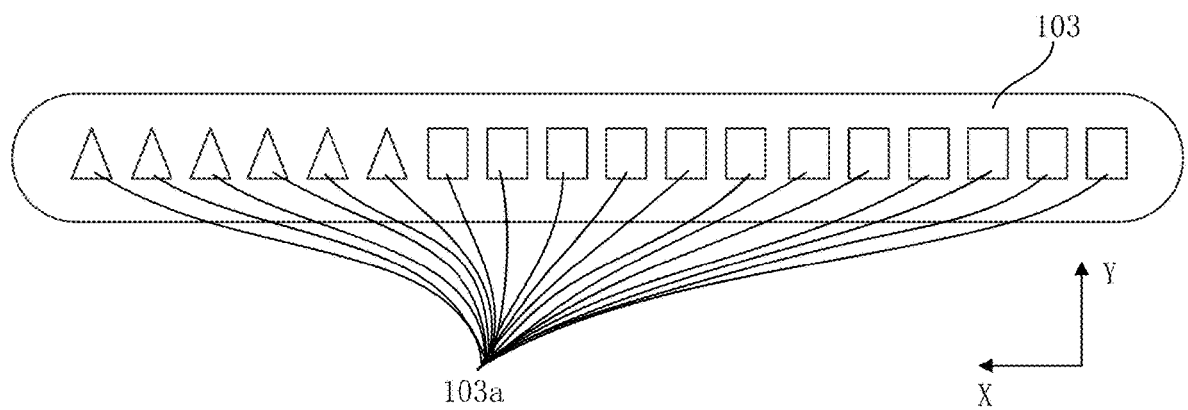
Figure 2C:
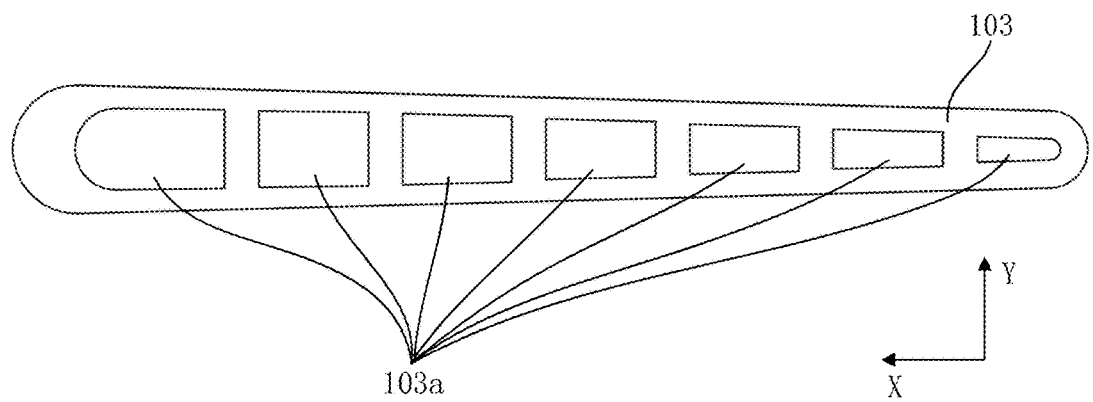

FIG. 2a to FIG. 2c are cross-sectional views of the micro-channel flat tube in FIG. 1. Referring to FIG. 2a to FIG. 2c, each micro-channel flat tube 103 is equipped with a plurality of channels 103a. A length of each channel 103a extends along a length direction of the micro-channel flat tube 103 and passes through two end faces of the micro-channel flat tube 103, each channel 103a is spaced in a width extension direction (X direction in the figure) of the micro-channel flat tube 103, and there is a spacing part b between adjacent channels 103a.

When the heat exchanger works, refrigerant flows through various channels and exchanges heat while a state changes. Structure and size of each channel 103a have an impact on the change of the refrigerant inside the channel. On the other hand, the refrigerant in work may be in a high-temperature and high-pressure state, with a certain pressure, and the micro-channel flat tube 103 needs to have a certain strength to ensure that the refrigerant does not leak.

In some embodiments, a cross-section of the flat tube is flat, two sides in a height direction (Y direction in the figure) are parallel, and a shape of a flowing cross-section of the channel is generally rectangular, and can also be circular or triangular in other shapes. The shapes of the flowing cross-sections of channels of one flat tube can also be different, for example, the flowing cross-sections of some channels are triangular, while the flowing cross-sections of other channels are rectangular. In other embodiments, the cross-section of the flat tube is fan-shaped, and the two sides in the height direction are not parallel, and sizes of the channels included in the flat tube are also different.

In the above embodiments, a width of the spacing part can be the same or different. The structure and size of the channel and the spacing part of the flat tube are designed according to requirements for the refrigerant used in the heat exchanger and requirements for a heat exchange performance.

Figure 3:
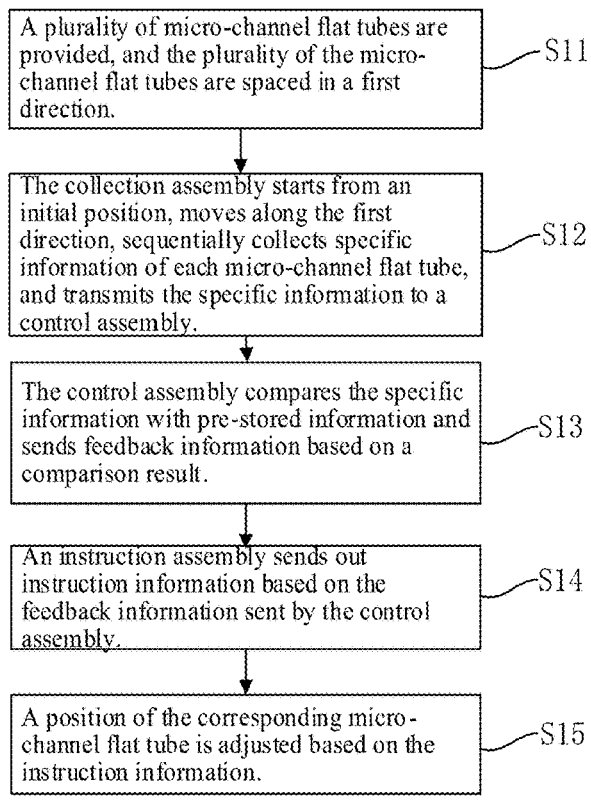
FIG. 3 is a flow chart of a heat exchanger processing method provided by embodiments of the present disclosure.

FIG. 3 is a flow chart of a heat exchanger processing method provided by embodiments of the present disclosure. Referring to FIG. 3, the heat exchanger processing method includes: S13-S15.

S11. A plurality of micro-channel flat tubes are provided, and the plurality of the micro-channel flat tubes are spaced in a first direction.

The micro-channel flat tube includes a plurality of channels extending in a length direction of the micro-channel flat tube. Two ends of each channel respectively pass through two end faces of the micro-channel flat tube, and each channel is arranged along the width extension direction of the micro-channel flat tube. There is a spacing part between two adjacent channels in the width direction of the micro-channel flat tube.

S12. The collection assembly starts from an initial position, moves along the first direction, sequentially collects specific information of each micro-channel flat tube, and transmits the specific information to a control assembly.

In some embodiments, the collection assembly moves along a sliding rod from the initial position, the initial position can be a position on the sliding rod corresponding to the first or last micro-channel flat tube in an arrangement direction of the micro-channel flat tube, or a position on the sliding rod corresponding to a specially designated micro-channel flat tube, which is not limited herein. The collection assembly moves along the arrangement direction of the micro-channel flat tube, with the arrangement direction of the micro-channel flat tube being the first direction, sequentially collects specific information (such as an image information of the end face or an outer peripheral surface of the micro-channel flat tube) of one end face or the outer peripheral surface of one or more the micro-channel flat tubes in the length direction, and transmits the specific information to the control assembly. The specific information on the end face of the micro-channel flat tube includes width information of one or more designated the channels, and width information and arrangement order of the plurality of designated channels. The designated channel includes the first channel or the last channel in the width direction of the micro-channel flat tube, or the first channel and the last channel in the width direction of the micro-channel flat tube.

In some embodiments, collecting specific information of each micro-channel flat tube includes one or more combinations of the following methods:

collecting cross-sectional area information of one or more designated channels of the micro-channel flat tube, in which the cross-sectional area information refers to the size and the shape of the cross-sectional area of the channel;

collecting cross-sectional area information and arrangement order of the plurality of designated channels of the micro-channel flat tube, in which the cross-sectional area information and arrangement order refer to the size of the cross-sectional area and the arrangement order of the size of the cross-sectional area.

collecting information of a designated spacing part of the micro-channel flat tube, in which the spacing part is located between two designated channels, the spacing part information refers to a width of the spacing part, and a width direction of the spacing part is parallel to the width direction of the micro-channel flat tube and a width direction of the channel;

collecting information and arrangement order of a plurality of designated spacing parts of the micro-channel flat tube, in which the information and arrangement order of the spacing part refer to the width of the spacing part and the arrangement order of width values of the spacing parts;

collecting height information of one designated channel of the micro-channel flat tube, in which the height information refers to a height value (a height of the channel in the Y direction in the figure). The information in embodiments of the present disclosure refers to including a parameter and all information except for the parameter.

S13. The control assembly compares the specific information with pre-stored information and sends feedback information based on a comparison result.

Specifically, the control assembly compares the specific information with the pre-stored information, if the specific information is different from the pre-stored information, for example, if the cross-sectional area of a certain designated channel detected is different from the pre-stored cross-sectional area of the designated channel, the comparison result is fed back to an instruction assembly. The pre-stored information includes the width information, the cross-sectional area information, the height information or the spacing part information of one or more designated channels, or the width information and arrangement order, the cross-sectional area information and arrangement order, the spacing part information and arrangement order of the plurality of designated channels.

S14. An instruction assembly sends out instruction information based on the feedback information sent by the control assembly.

S15. A position of the corresponding micro-channel flat tube is adjusted based on the instruction information.

Specifically, based on the feedback information, if the specific information of a certain micro-channel flat tube collected is inconsistent with the pre-stored information, the collection assembly stops at a specific position, such as a position at where the micro-channel flat tube installed incorrectly or installed reversely is located, and the instruction assembly sends out the instruction information. Furthermore, the instruction information can be provided through a light source or an alarm sound to adjust the position of the corresponding micro-channel flat tube. After adjusting the position of the corresponding micro-channel flat tube, the collection assembly continues to move and collect specific information of one or more micro-channel flat tubes again until an information collection of all micro-channel flat tubes and adjustment of the incorrectly installed micro-channel flat tube are completed.

For example, if the collection assembly collects the width of the first channel in the width direction of the micro-channel flat tube as L, the control assembly compares the width L of the first channel with a pre-stored width L' of the first channel of the corresponding micro-channel flat tube. If $L=L'$, it indicates that the corresponding micro-channel flat tube is installed correctly, and if $L \neq L'$, it indicates that the corresponding micro-channel flat tube is installed incorrectly. Alternatively, if the widths of the first to third channels sampled in the width direction of the micro-channel flat tube are $L1$, $L2$, and $L3$, respectively, the control assembly compares the widths of the first to third channels with pre-stored widths $L1'$, $L2'$, and $L3'$ of the first to third channels of the corresponding micro-channel flat tube. If $L1=L1'$, $L2=L2'$, $L3=L3'$, it indicates that the corresponding micro-channel flat tube is installed correctly, otherwise it is an installation error.

Furthermore, adjusting the position of the corresponding micro-channel flat tube based on the instruction information includes moving the micro-channel flat tube along a second direction based on the instruction information, in which the second direction is perpendicular to the first direction or there is an angle between the second direction and the first direction.

In embodiments of the present disclosure, the instruction assembly and the collection assembly move synchronously. It can be understood that in other embodiments, the instruction assembly can also be provided separately from the collection assembly, and the instruction assembly does not need to move synchronously with the collection assembly.

Figure 4:
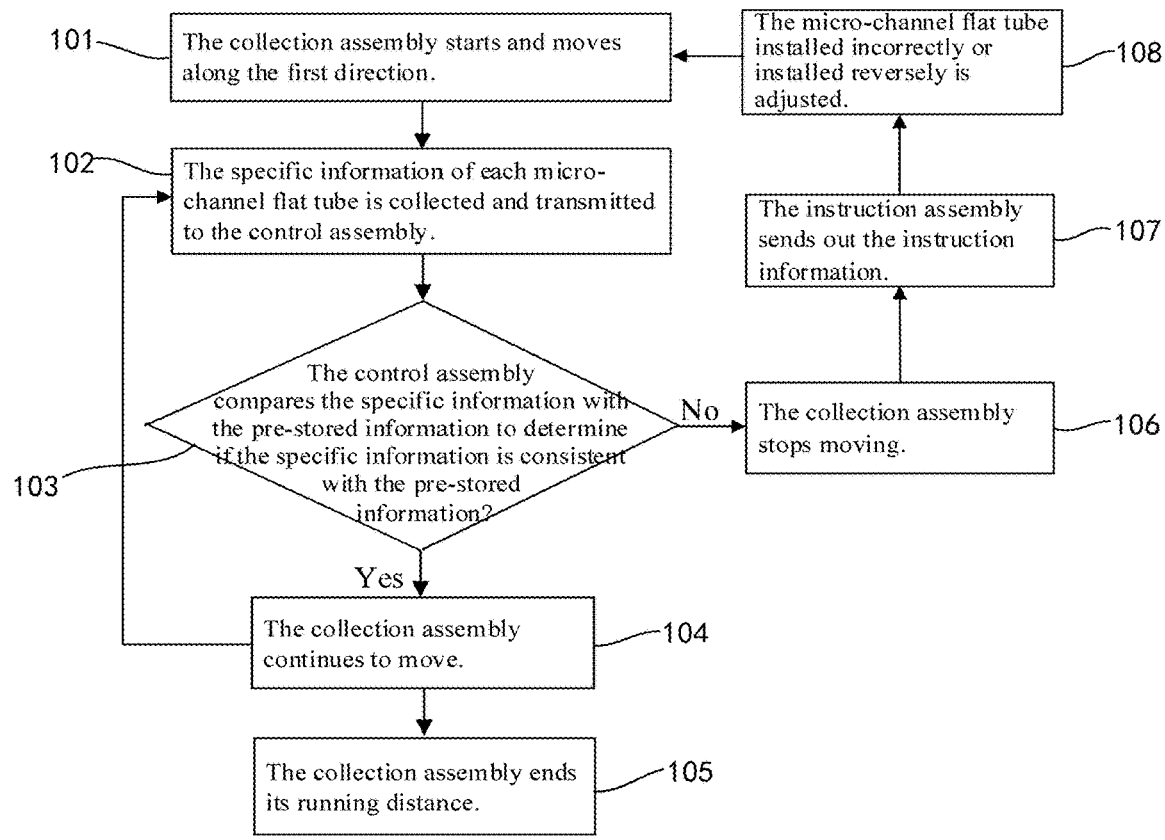
FIG. 4 is a further specific flow chart of steps S12 to S15 in FIG. 3.
Figure 5:
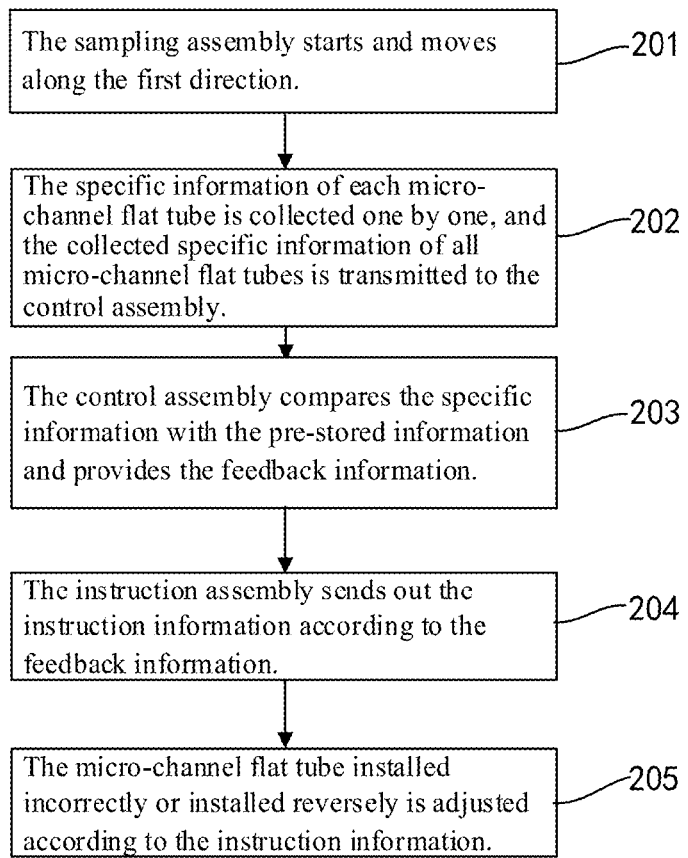
FIG. 5 is a flow chart of the heat exchanger processing method provided by another embodiment of the present disclosure.
Figure 6:
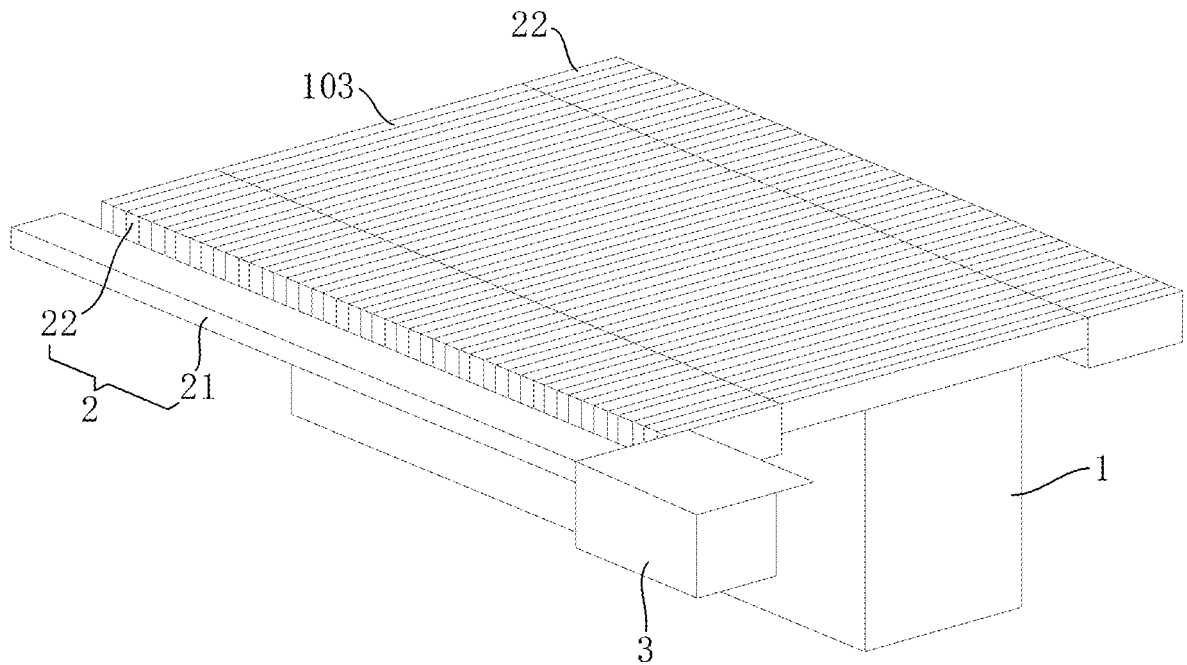
FIG. 6 is a schematic diagram of a processing device for a heat exchanger provided by embodiments of the present disclosure.

FIG. 4 shows a further specific flow chart of steps S12 to S15 in FIG. 3. Referring to FIG. 4, the above steps S12 to S15 further include: S101-S108.

S101. The collection assembly starts and moves along the first direction.

S102. The specific information of each micro-channel flat tube is collected and transmitted to the control assembly.

S103. The control assembly compares the specific information with the pre-stored information to determine if the specific information is consistent with the pre-stored information? If a judgment result is "Yes", step S104 is implemented, and if the judgment result is "No", step S106 is implemented.

S104. The collection assembly continues to move.

The collection assembly continues to move and repeats step S102.

S105. The collection assembly ends its running distance.

S106. The collection assembly stops moving.

S107. The instruction assembly sends out the instruction information.

S108. The micro-channel flat tube installed incorrectly or installed reversely is adjusted.

After adjusting the micro-channel flat tube installed incorrectly or installed reversely, step S101 continues to be repeated.

On the basis of the above embodiments, another heat exchanger processing method is also proposed in embodiments of the present disclosure. A difference between the present embodiment and the above embodiment is that in the present embodiment, the collection assembly needs to collect specific information of all micro-channel flat tubes that need to be collected, and then transmit the specific information to the control assembly. The control assembly compares the collected specific information of all micro-channel flat tubes with the pre-stored information, and provides the feedback information based on the comparison results, so that the instruction assembly sends out the instruction information based on the feedback information provided by the control assembly, and adjusts all micro-channel flat tubes that are installed incorrectly or installed reversely based on the instruction information.

In the present embodiment, the heat exchanger processing method includes steps S201-S205.

S201. The collection assembly starts and moves along the first direction.

S202. The specific information of each micro-channel flat tube is collected one by one, and the collected specific information of all micro-channel flat tubes is transmitted to the control assembly.

S203. The control assembly compares the specific information with the pre-stored information and provides the feedback information.

S204. The instruction assembly sends out the instruction information based on the feedback information.

S205. The micro-channel flat tube installed incorrectly or installed reversely is adjusted based on the instruction information.

On the basis of the above embodiments, embodiments of the present disclosure also provide a processing device for a heat exchanger. The processing device is configured to implement the heat exchanger processing method of the above embodiments. FIG. 4 is a schematic diagram of the processing device provided by embodiments of the present disclosure. Referring to FIG. 4, the processing device includes a supporting frame 1, an installing assembly 2, a collection assembly 3, a control assembly (not shown in the figure), and an instruction assembly (not shown in the figure). The installing assembly 2 is provided at an upper part of the supporting frame 1 to support the installing assembly 2 through the supporting frame 1. The installing assembly 2 is configured to fix the micro-channel flat tube 103, and the collection assembly 3 is configured to sample a surface specific information of each micro-channel flat tube 103. The control assembly is connected to the collection assembly 3 and the instruction assembly respectively, and is configured to compare the specific information of each micro-channel flat tube 103 collected by the collection assembly 3 with the pre-stored information, and provide the feedback information based on the comparison result, so that the instruction assembly can send out the instruction information based on the feedback information provided by the control assembly.

Specifically, the collection assembly 3 is moveable back and forth along the arrangement direction of the micro-channel flat tube 103 to collect the specific information on a circumferential surface or end face of the micro-channel flat tube 103, and transmit the specific information to the control assembly. After receiving the specific information transmitted by the collection assembly 3, the control assembly compares the specific information with the pre-stored information and sends the feedback information to the instruction assembly based on the comparison result, so that the instruction assembly sends out the instruction information based on the feedback information transmitted by the control assembly, such as pointing out the micro-channel flat tube installed incorrectly or installed reversely.

Furthermore, the installing assembly 2 includes a sliding rod 21 and a comb-shaped member 22. A length extension direction of the comb-shaped member 22 is parallel to the first direction (the arrangement direction of the micro-channel flat tube), and the comb-shaped member 22 includes a plurality of comb teeth, a plurality of the comb teeth are spaced in the first direction to fix the micro-channel flat tube 103. A length extension direction of the sliding rod 21 is parallel to the first direction, and the collection assembly 3 can move back and forth along the sliding rod 21.

The above is only preferred specific implementations of the present disclosure, but the scope of protection of the present disclosure is not limited to this. Any changes or replacements that can be easily thought of by those skilled familiar with the art within the technology scope of the present disclosure should be covered within the scope of protection of the present disclosure. Therefore, the scope of protection of the present disclosure should be based on the scope of protection of claims.

What is claimed is:

1. A heat exchanger processing method, wherein a heat exchanger comprises a plurality of micro-channel flat tubes, and the heat exchanger processing method comprises:
   providing a plurality of micro-channel flat tubes, wherein each micro-channel flat tube comprises a plurality of channels extending in a length direction of the micro-channel flat tube, and the plurality of micro-channel flat tubes are spaced in a first direction;
   moving a sampler starting from an initial position along the first direction to collect specific information of one or more micro-channel flat tubes one by one, and transmitting the specific information to a controller;
   comparing, by the controller, the specific information with pre-stored information and generating, based on a comparison result, feedback information;
   generating, by an instruction circuit based on the feedback information, instruction information; and
   adjusting a position of a corresponding micro-channel flat tube based on the instruction information.

2. The heat exchanger processing method of claim 1, wherein collecting the specific information of one or more micro-channel flat tubes comprises:
   collecting, by the sampler, information of an end face, one of two opposite end faces of the micro-channel flat tube in the length direction, of the micro-channel flat tube, wherein the information of the end face comprises width information of one or more designated channels; and
   wherein comparing, by the controller, the specific information with the pre-stored information and generating, based on the comparison result, the feedback information comprises:
   comparing, by the control assembly, the width information with the pre-stored information and generating, based on the comparison result, the feedback information.

3. The heat exchanger processing method of claim 2, wherein collecting, by the sampler, information of the end face, one of two opposite end faces of the micro-channel flat tube in the length direction, of the micro-channel flat tube comprises:
   collecting, by the sampler, the width information of a first channel and/or a last channel, arranged in a width direction, of each micro-channel flat tube.

4. The heat exchanger processing method of claim 1, wherein moving the sampler starting from the initial position along the first direction to collect specific information of one or more micro-channel flat tubes one by one comprises:
   moving the sampler to collect end face information of an end face, one of two opposite end faces of the micro-channel flat tube in the length direction, of the micro-channel flat tube; and
   wherein generating, by the instruction circuit based on the feedback information, the instruction information comprises:
   generating, by the instruction circuit, the instruction information in response to the end face information of a micro-channel flat tube being inconsistent with the pre-stored information based on the feedback information.

5. The heat exchanger processing method of claim 1, wherein generating, by the instruction circuit based on the feedback information, the instruction information and adjusting the position of the corresponding micro-channel flat tube based on the instruction information comprises:
   stopping the sampler at a specific position based on the feedback information and generating the instruction information through the instruction circuit;
   adjusting the position of the corresponding micro-channel flat tube based on the instruction information; and
   continuously moving the sampler until collection of information for all the micro-channel flat tubes is completed.

6. The heat exchanger processing method of claim 1, further comprising: re-collecting, by the sampler, the specific information of one or more micro-channel flat tubes.

7. The heat exchanger processing method of claim 1, wherein collecting the specific information of one or more micro-channel flat tubes comprises:
   collecting, by the sampler, information on an end face of the micro-channel flat tube, wherein the information on the end face comprises width information and an arrangement order of the plurality of designated channels; and
   wherein comparing, by the controller, the specific information with the pre-stored information and generating, based on the comparison result, the feedback information comprises:
   comparing, by the controller, the width information and the arrangement order with the pre-stored information, and generating, based on the comparison result, the feedback information.

8. The heat exchanger processing method of claim 1, wherein there is a spacing part between two adjacent channels in a width direction of each micro-channel flat tube, and collecting the specific information of one or more micro-channel flat tubes comprises at least one of:
   collecting cross-sectional area information of one or more designated channels of each micro-channel flat tube;
   collecting cross-sectional area information and an arrangement order of a plurality of designated channels of each micro-channel flat tube;
   collecting information of a designated spacing part of each micro-channel flat tube, wherein the spacing part is located between two designated channels;
   collecting information and an arrangement order of a plurality of designated spacing parts of each micro-channel flat tube; or
   collecting height information of one or more designated channels of each micro-channel flat tube.

9. The heat exchanger processing method of claim 1, wherein moving the sampler starting from the initial position along the first direction to collect the specific information of one or more micro-channel flat tubes one by one, and transmitting the specific information to the controller comprises:
   moving the sampler along the first direction, and transmitting the specific information to the controller after collection of the specific information of all the micro-channel flat tubes is completed.

10. The heat exchanger processing method of claim 1, wherein the sampler moves synchronously with the instruction circuit.

11. The heat exchanger processing method of claim 1, wherein adjusting the position of the corresponding micro-channel flat tube based on the instruction information comprises:
   moving the corresponding micro-channel flat tube along a second direction based on the instruction information, wherein the second direction is perpendicular to the first direction or there is an angle between the second direction and the first direction.

12. A heat exchanger processing device, comprising a first assembly, a sampler, a controller, and an instruction circuit, wherein the first assembly comprises a sliding rod, the sampler and the instruction circuit is movable back and forth along the sliding rod, the first assembly further comprises a comb-shaped member, a length direction of the comb-shaped member is parallel to a first direction, the comb-shaped member comprises a plurality of comb teeth, the comb teeth are spaced in the first direction, and the controller is connected to the sampler and the instruction circuit respectively.

13. The heat exchanger processing device of claim 12, wherein the sampler is configured for moving from an initial position along the first direction to collect specific information of one or more micro-channel flat tubes one by one, and transmitting the specific information to the controller;
   the controller is configured for comparing the specific information with pre-stored information and generating, based on a comparison result, feedback information;
   the instruction circuit is configured for generating instruction information based on the feedback information, wherein the instruction information is used for instructing an adjustment of the micro-channel flat tube.

14. The heat exchanger processing device of claim 13, wherein the sampler is configured for collecting end face information of an end face, one of two opposite end faces of the micro-channel flat tube in its length direction, of the micro-channel flat tube.

15. The heat exchanger processing device of claim 14, wherein the instruction circuit is configured for generating the instruction information in response to the end face information of a micro-channel flat tube being inconsistent with the pre-stored information based on the feedback information.

16. The heat exchanger processing device of claim 13, wherein the sampler is configured for collecting information of an end face, one of two opposite end faces of the micro-channel flat tube in its length direction, of the micro-channel flat tube, wherein the information of the end face comprises width information of one or more designated channels.

17. The heat exchanger processing device of claim 16, wherein the controller is configured for comparing the width information with the pre-stored information and generating, based on the comparison result, the feedback information.

18. The heat exchanger processing device of claim 13, wherein the sampler is configured for moving along the first direction and transmitting the specific information to the controller after collection of the specific information of all the micro-channel flat tubes is completed.

19. The heat exchanger processing device of claim 13, wherein the sampler is configured for moving synchronously with the instruction circuit.

20. A heat exchanger processing method, wherein a heat exchanger comprises a plurality of micro-channel flat tubes, and the heat exchanger processing method comprises:
   providing a plurality of micro-channel flat tubes, wherein each micro-channel flat tube comprises a plurality of channels extending in a length direction of the micro-channel flat tube, and the plurality of micro-channel flat tubes are spaced in a first direction;

moving the plurality of the micro-channel flat tubes starting from an initial position along the first direction;

collecting, by a sampler, specific information of one or more micro-channel flat tubes one by one; and transmitting the specific information to a controller;

comparing, by the controller, the specific information with pre-stored information and generating, based on a comparison result, feedback information, generating, by an instruction circuit, instruction information based on the feedback information; and adjusting a position of a corresponding micro-channel flat tube based on the instruction information.

* * * * *